United States Patent [19]

Lederman

[11] Patent Number: 5,669,476
[45] Date of Patent: Sep. 23, 1997

[54] ROLLER CLUTCH WITH SECURE SPRING TO CAGE MOUNT

[75] Inventor: Frederick Edward Lederman, Sandusky, Ohio

[73] Assignee: General Motors Corporation, Detroit, Mich.

[21] Appl. No.: 645,978

[22] Filed: May 14, 1996

[51] Int. Cl.⁶ .................................................. F16D 41/064
[52] U.S. Cl. .......................... 192/45; 192/44; 188/82.84
[58] Field of Search .................... 192/44, 45; 188/82.84

[56] References Cited

U.S. PATENT DOCUMENTS

| | | | |
|---|---|---|---|
| 3,651,908 | 3/1972 | Oldfield | 192/45.1 |
| 3,917,036 | 11/1975 | Johnson et al. | 192/45 |
| 4,054,192 | 10/1977 | Johnson | 192/45 |
| 4,088,211 | 5/1978 | Doller et al. | 192/45 |
| 4,185,724 | 1/1980 | Kitchin | 192/45 |
| 4,187,937 | 2/1980 | Kitchin | 192/45 |
| 4,549,638 | 10/1985 | Johnston | 192/45 |
| 4,711,330 | 12/1987 | Lederman | 192/45 |
| 4,782,928 | 11/1988 | Lederman | 192/45 |
| 4,828,085 | 5/1989 | Lederman | 192/45 |
| 4,850,462 | 7/1989 | Lederman | 192/45 |
| 4,850,464 | 7/1989 | Doller et al. | 192/45 |
| 4,932,508 | 6/1990 | Lederman | 192/45 |
| 4,987,670 | 1/1991 | Papania | 29/451 |

*Primary Examiner*—Andrea L. Pitts
*Attorney, Agent, or Firm*—Patrick M. Griffin

[57] ABSTRACT

An accordion type roller clutch energizing spring has a specially designed mounting fold which, when pressed radially down and over a flat faced radial cage cross bar, is retained to the cross bar with improved stability. The front and rear leaves of the mounting fold of the spring have a free state separation equal to the basic thickness of the cage cross bar. However, the rear leaf of the spring mounting fold is stamped with an integral bump or the like, which engages the rear face of the cross bar to spread the two leaves apart, creating extra tension in the mounting fold. The front leaf of the mounting fold is thereby kept snug and flat to the front face of the cage cross bar at all times.

1 Claim, 5 Drawing Sheets

U.S. Patent    Sep. 23, 1997    Sheet 1 of 5    5,669,476
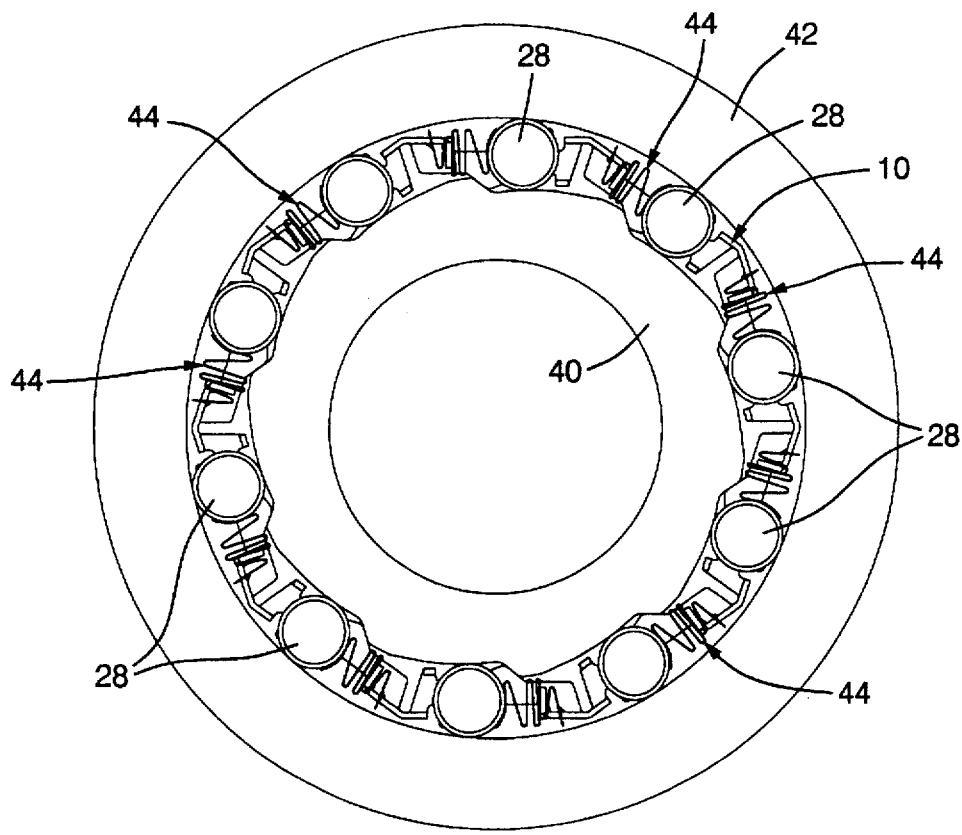
FIG. 1
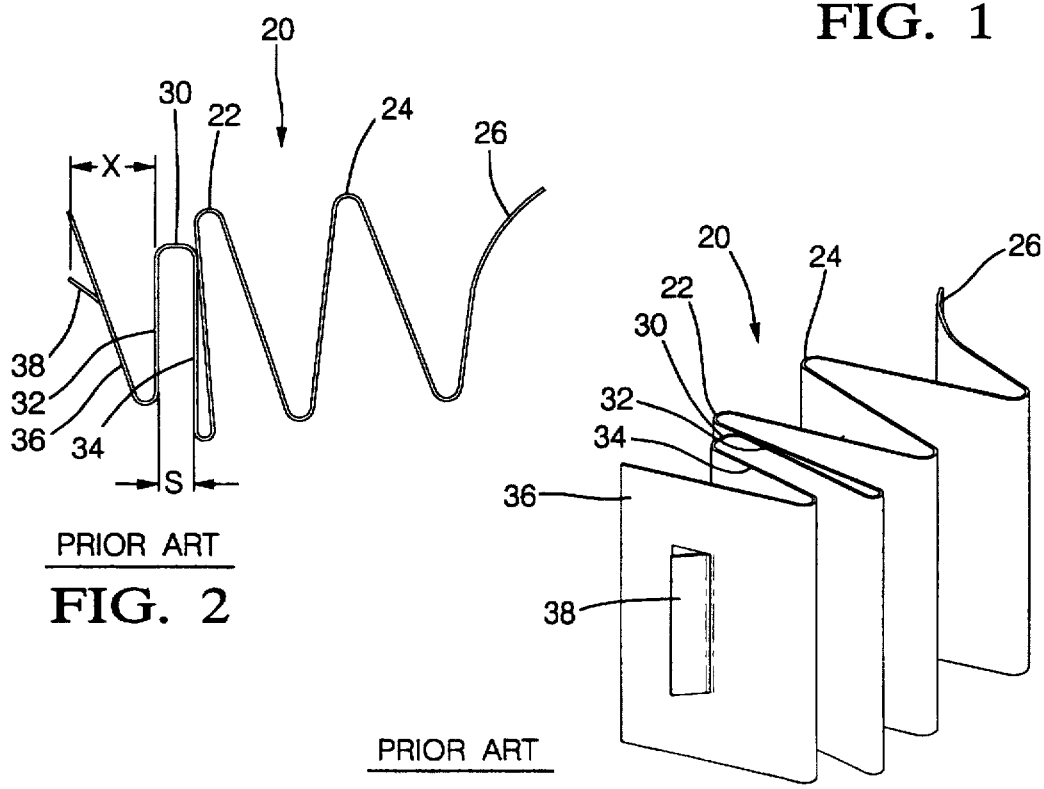
PRIOR ART
FIG. 2
PRIOR ART
FIG. 3

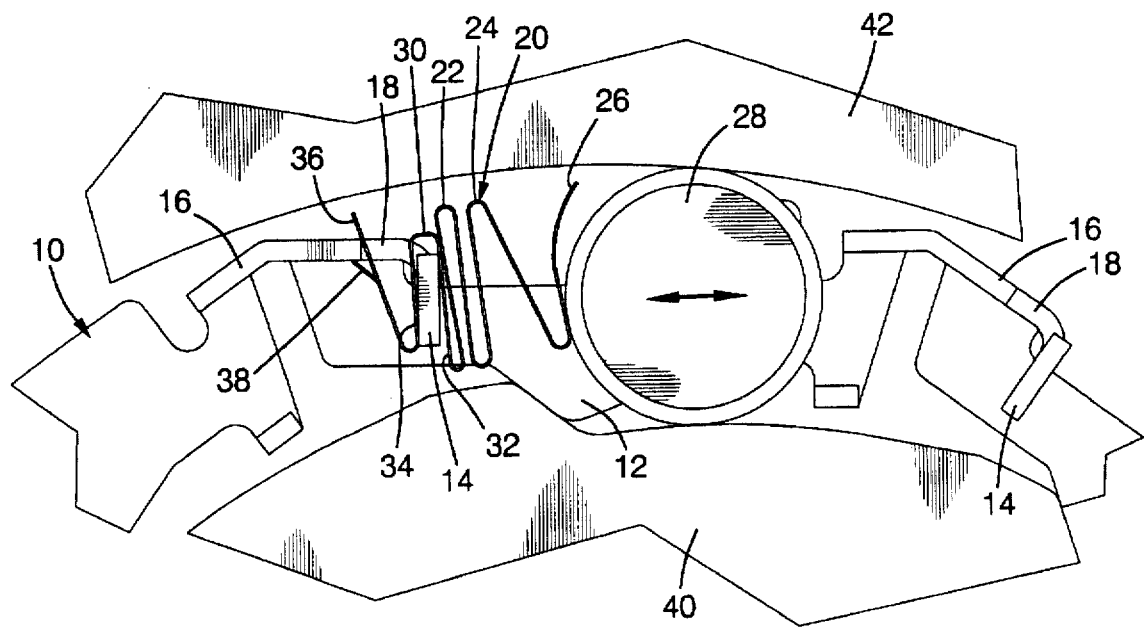
PRIOR ART
FIG. 6
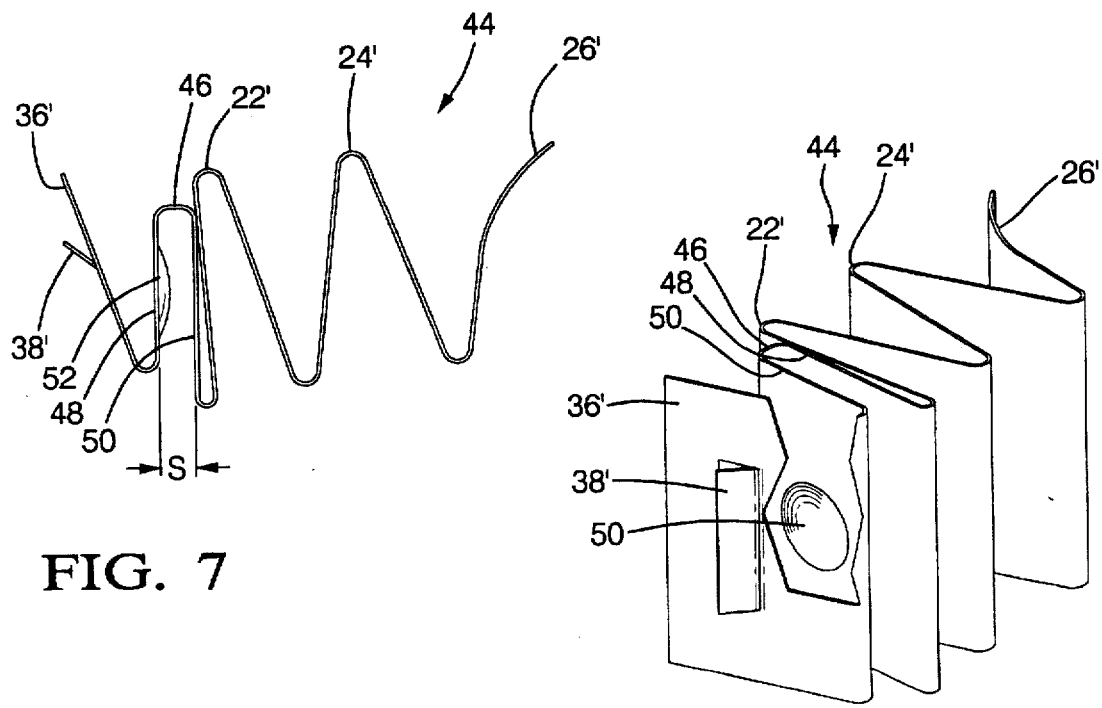
FIG. 7
FIG. 8

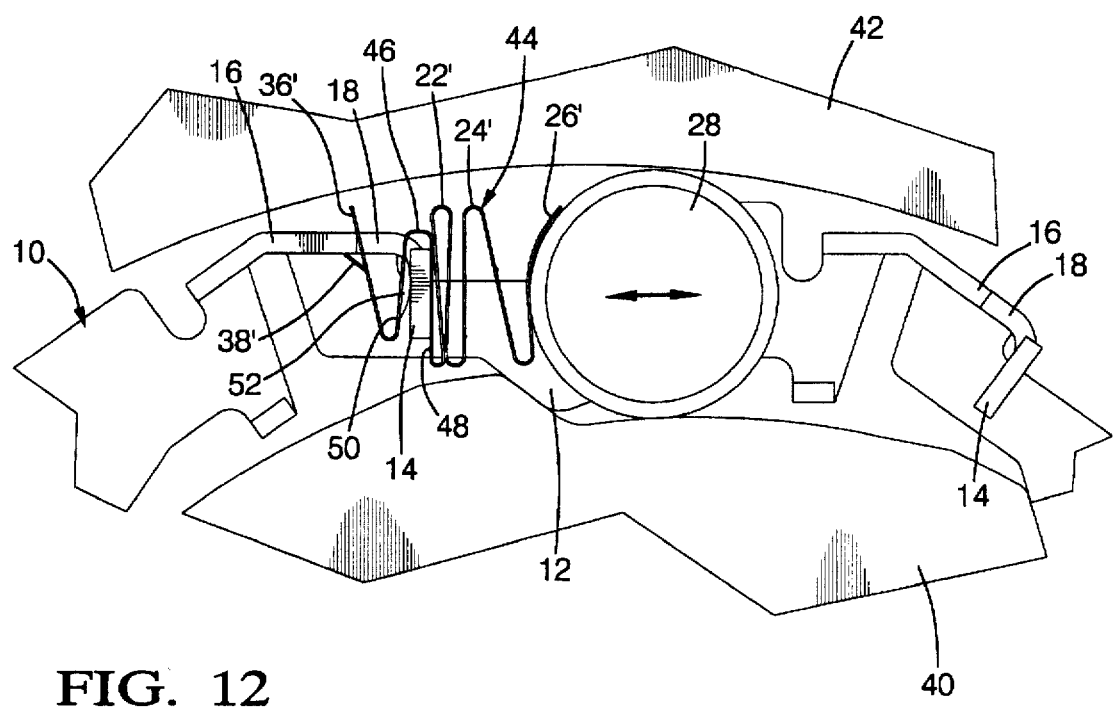
FIG. 12
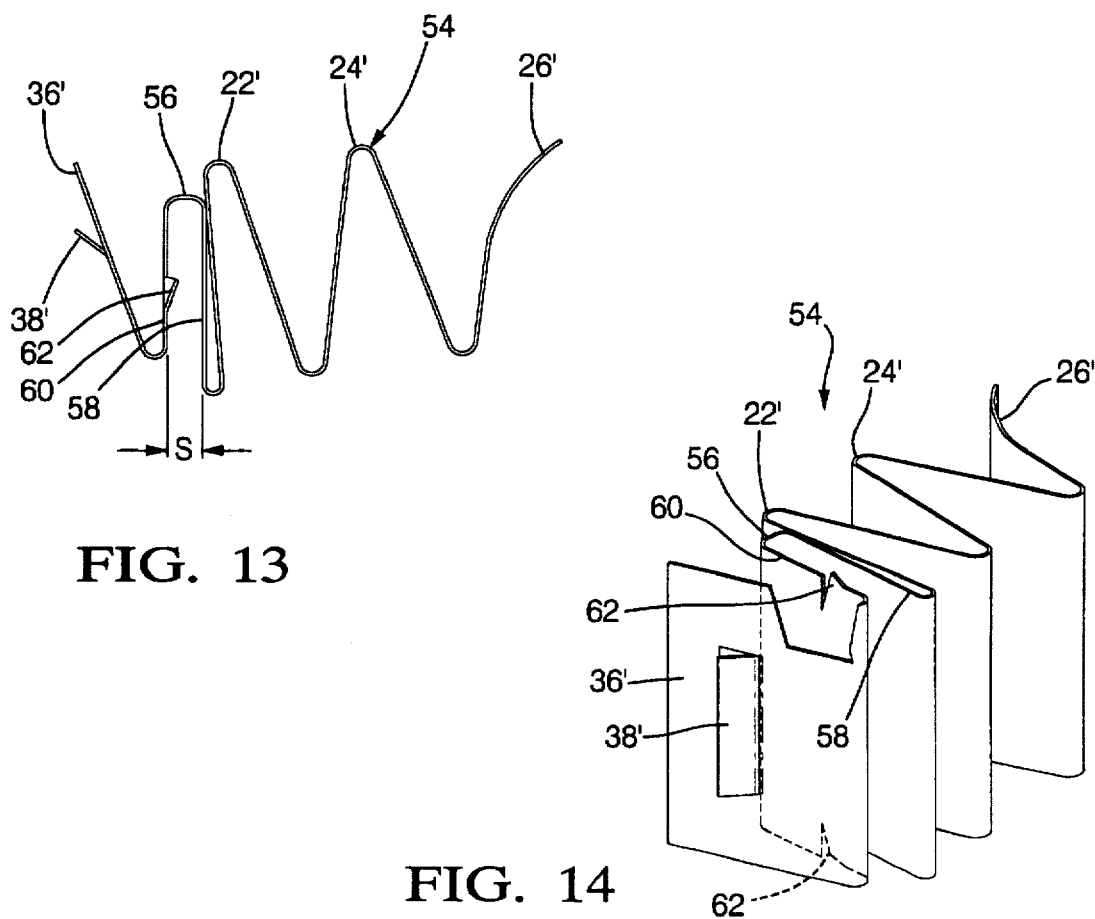
FIG. 13
FIG. 14

ROLLER CLUTCH WITH SECURE SPRING TO CAGE MOUNT

This invention relates to roller clutch springs in general, and specifically to an accordion type roller clutch energizing spring in which the spring is retained within the cage roller pocket with improved security and stability, and with no structural change to the roller clutch cage.

BACKGROUND OF THE INVENTION

One way roller clutches typically have a cage that provides a plurality of evenly spaced, generally rectangular pockets. Each pocket contains a roller and an individual roller energizing spring. The energizing springs are most commonly stamped from flat, resilient spring steel stock with generally V shaped folds. The springs may be of the type in which the folds are comprised of axially opening leaves, as shown in coassigned U.S. Pat. No. 4,850,464. In clutches of this type, the springs are usually just seated within a cage pocket, without a special latch structure on the end of the spring to physically tie it to the cage. The orientation of the leaves is not conducive to such a latch structure.

The other common accordion spring configuration has spring folds that are radially opening, as disclosed in coassigned U.S. Pat. No. 4,088,211. Since the pockets and the cage cross bars that make up the pockets are radially directed, it is convenient to tie the springs to the cage by pushing one of the spring's folds radially over a cage cross bar while a latch lanced out of the very end leaf of the spring clicks under an adjacent surface of the cage. The fold used to mount the spring, obviously, becomes inactive in terms of energizing the roller, and may be squared off in order to better conform to the cross bar. The latch retains the spring's mounting fold from pulling radially off of the cage cross bar. Structural changes to improve the security of this spring mounting system have generally involved new and more complex end leaf latch mechanisms, as shown in coassigned U.S. Pat. Nos. 4,850,462 and 4,782,928. These new latch designs make better use of the latching surfaces available on a conventional cage, but do not change the cage structure itself.

The standard cage and spring design of the type disclosed in the older U.S. Pat. No. 4,088,211 is still very commonly used, because it is simple and easy to manufacture, and is shown in FIGS. 2 through 4 of the accompanying drawings. A cage, indicated generally at 10, is of the metal folded type, with a series of box shaped roller pockets 12. Each pocket 12 is defined at one end by a radially directed cage cross bar 14 which, in turn, is adjacent to a circumferentially directed cross bar 16, separated therefrom by a radially opening slot 18 of width W that is adjacent to the radially outer edge of cross bar 16. Each part of cage 10 has basically the same thickness, being folded and stamped from a single thickness of metal stock. The standard energizing spring, indicated generally at 20, has a pair of active V shaped folds, a middle fold 22 and front fold 24, the forwardmost leaf 26 of which is curved to match a cylindrical roller 28. The spring fold 30 adjacent to the middle active fold, which is used as the mounting fold, is squared off, with front leaf 32 and rear leaf 34, which, while they are not intended to compress and expand, are resilient nonetheless. However, that resilience does not come into play since the free state separation of the leaves 32 and 34, shown at S, is basically equal to the thickness of cage cross bar 14 over which it is to be seated. This means that the leaves 32 and 34 do not pinch the faces of the cross bar 14 with any significant force when they are seated over it, nor are they intended to do so.

The two obvious ways to stamp the mounting fold 30 such that it would apply a pinch force to the cross bar 14 would each be impractical. One possible way would be to stamp the fold 30 with the same free state separation S at just the squared off end, but with the opposite ends of the leaves 32 and 34 pinched in and touching in the free state, like the ends of a hair pin. The pinching force applied to the cross bar 14 would be somewhat greater, but some means would have to be provided to spread the pinched in ends apart when spring 20 was installed to assure proper seating over the cross bar 14. The other possible way would be to make the entire free state spacing between the leaves 32 and 34 less, by thinning out the squared off end to a thickness less than the thickness of cross bar 14. The problem then would be that both leaves 32 and 34 would be spread apart into an ill fitting V shaped configuration by the wider cross bar 14, with neither leaf 32 or 34 held flat to the cross bar 14.

Because of the inevitably weak potential pinching force described above, the mounting fold 30 must be retained to the cross bar 14 externally by a latch 38 that is lanced out of the endmost spring leaf 36. Pre installation, the latch 38 is spaced from the mounting fold rear leaf 34 by a distance X that is greater than W. This assures that, as the mounting fold 30 is pushed radially in and down over radial cross bar 14, endmost leaf 36 will radially enter and drag along the edge of slot 18 until the latch 38 clicks past the edge of slot 18 and beneath the adjacent cross bar 16 to retain mounting fold 30 against radial removal, as shown in FIG. 4. After installation, spring 20 sits in a pocket 12, ready to have a roller 28 installed against its forwardmost leaf 26. However, for the reasons noted, the mounting fold's front leaf 32 is not held against the cage cross bar 14 with any great force. In fact, the more powerful latch 38 can force the front leaf 32 away from the front face of cross bar 14, leaving a gap, as is actually shown in FIG. 4.

This retention scheme for spring 20 leads to several problems, both during shipping and handling of the clutch, and during operation. As shown in FIG. 5, when a roller 28 has been installed in pocket 12 and against the curved leaf 26, it is the resilience of the compressed spring 20 that presses the roller 28 into the forward edges of the pocket 12 to retain it in the cage 10. The latch 38 is so strong compared to the active spring folds, however, that even when spring 20 is somewhat compressed back toward the cross bar 14, the front leaf 32 can still remain spaced away from the front face of cross bar 14. While the roller retention force from the compressed spring 20 is weak at best, it is sufficient if the cage 10 is handled carefully. If the cage 10 is jostled during handling, however, the spring 20 can flip up and out of the pocket 12 as the spring curved leaf 26 slips radially outwardly and off of the roller 28. In that case, the untensioned mounting fold front leaf 32 spreads farther away from the cage cross bar 14. During operation, the cage 10 is installed between a pair of inner and outer clutch races 40 and 42, as shown in FIG. 6. As with any energizing spring, it is the expansion and contraction of spring 20 that keeps roller 28 in a lock up ready position as it rolls back and forth, as shown by the arrow in FIG. 6. The roller 28 is thereby kept in a position where it is ready to jam between the races 40 and 42. Spring 20 reacts against and from the cage radial cross bar 14. The stability and operational effectiveness of spring 20 depends on how securely and stably it is tied to cross bar 14. At some point, spring 20 will be compressed back toward the cross bar 14 to equal and balance the opposed force of the latch 38, destabilizing the grip of the mounting fold 30 to the cross bar 14. Spring 20 is then vulnerable to radially outwardly acting forces, such as centrifugal force or the force of lubricant being pumped radially outwardly, which can potentially flip it up and off of roller 28, as shown in FIG. 6.

SUMMARY OF THE INVENTION

The invention provides a novel mounting structure on the spring that fixes the spring's mounting fold to the cage cross bar with improved security and stability, but with no structural change to the cage or the rest of the spring.

In the embodiment disclosed, a folded metal roller clutch cage has the conventional design described above, with a radially extending, flat faced cross bar of predetermined thickness and a radially opening slot behind the cross bar. The spring has a conventional design and shape at all points forward of the mounting fold, with a pair of active folds and a forwardmost leaf that engages the roller. The latch that enters the slot is conventional in size and shape, as well. The spring mounting fold, located between the latch and the active part of the spring, has flat front and rear leaves, the nominal, free state separation of which is basically the same as the thickness of the cross bar. While the front leaf of the mounting fold is flat and uninterrupted, however, the rear leaf of the mounting fold is integrally stamped with a spreading wedge that serves to stabilize the active portion of the spring. Specifically, the rear leaf has a structural feature stamped into it, either a centrally located bump, inwardly bent tabs, or a similar feature that extends partially across the free state separation and toward the front leaf. Consequently, when the spring is installed as usual, the latch enters and clicks into the slot as the spreading wedge simultaneously drags along the rear face of the cross bar, spreading the mounting fold leaves apart and putting the mounting fold into greater tension. The mounting fold front leaf is thereby pulled into a gap free, flat, and stable abutment to the front surface of the cross bar. Thereafter, the active portion of the spring reacts off of this stable and secure platform.

DESCRIPTION OF THE PREFERRED EMBODIMENT

These and other features of the invention will appear from the following written description, and from the drawings, in which FIG. 1 is an axial view of a pair of clutch races with a roller clutch incorporating the springs of the invention installed between the races;

FIG. 2 is a side view of the prior art spring described above;

FIG. 3 is a perspective view of the prior art spring;

FIG. 6 shows a cage with prior art spring and roller installed during clutch operation;

FIG. 7 is a side view of one embodiment of a spring made according to the invention;

FIG. 8 shows a perspective view of the spring of FIG. 7 partially broken away to better reveal the rear leaf of the mounting fold;

FIG. 12 shows the roller of FIG. 11 moved back farther, compressing the spring farther;

FIG. 13 is a side view of another embodiment of a spring made according to the invention; and FIG. 14 is a perspective view of the spring of FIG. 13 partially broken away to reveal the rear leaf of the mounting fold.

Figure 4:
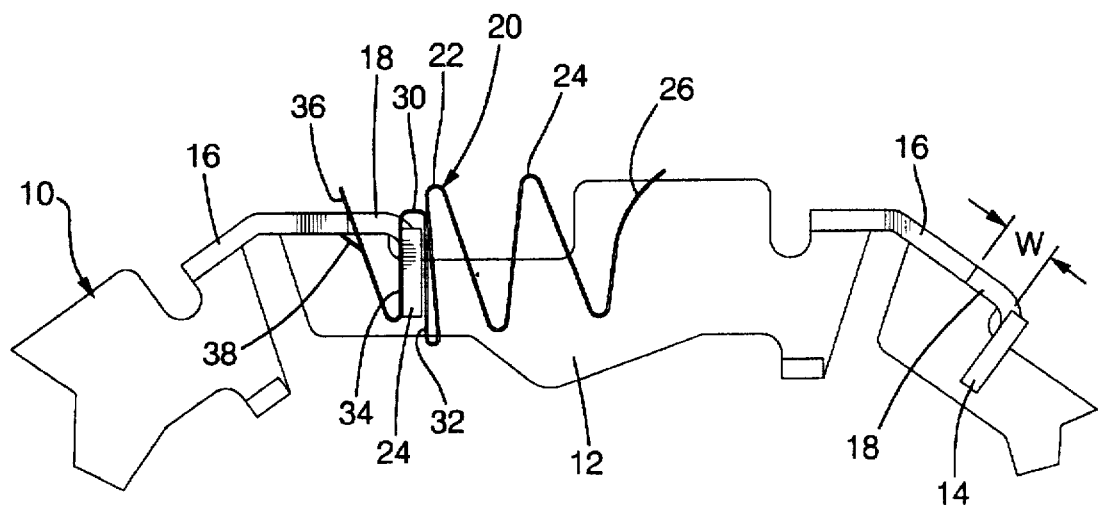
FIG. 4 shows the prior art spring mounted to the cage before installation of a roller.
Figure 5:
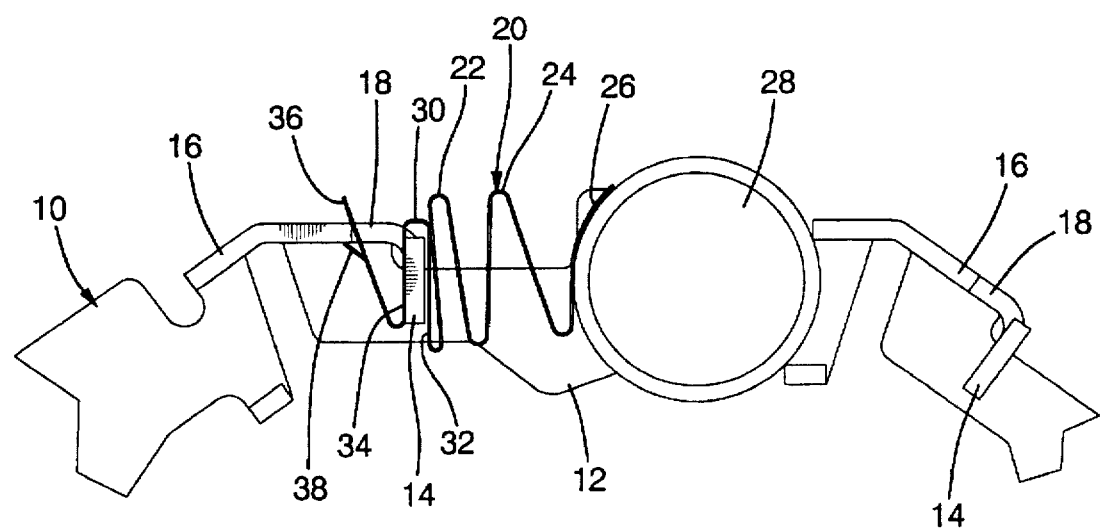
FIG. 5 shows how a prior art spring compressed slightly, after addition of a roller, but before installation of the cage between clutch races.
Figure 9:
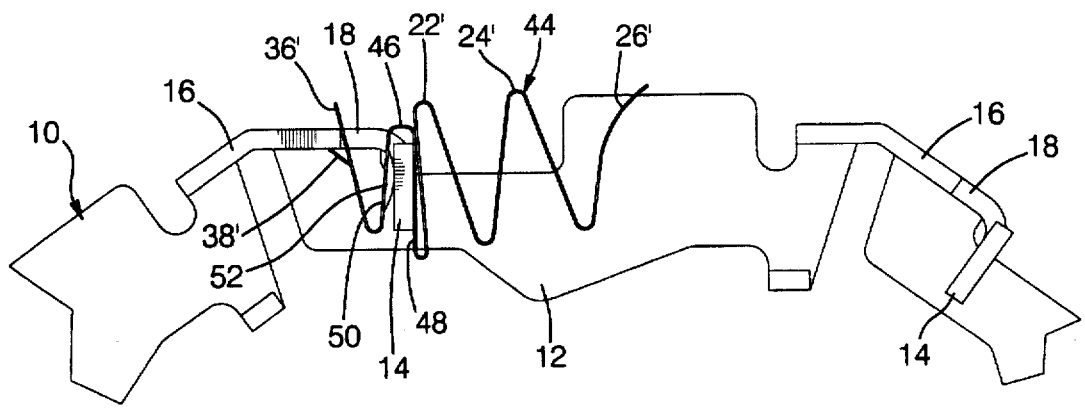
FIG. 9 shows a view like FIG. 4, but with the spring of FIG. 7 installed to the cage.

Referring first to FIGS. 1 and 9, springs made according to the invention are installed to a cage 10 just like that described above, which is ultimately installed to an inner cam race 40, between inner race 40 and outer race 42, which parts are numbered identically to those described above. The invention requires no change to cage 10, which would have the same slot 18 with the same slot width W and the same flat faced cross bar 14 with the same thickness. Springs made according to the invention would be manufactured with the same basic method as spring 20 described above, and installed to cage 10 in the same way, as will be described in detail below.

Referring next to FIGS. 7 and 8, a first embodiment of a spring made according to the invention is indicated generally at 44. Many of the structural features of spring 44 (and a second embodiment described below) are identical to spring 20, both as to shape, dimension and material. These include the active folds 22 and 24, the curved leaf 26, the endmost leaf 36 and the latch 38, all of which structural features are given the same number with a prime (') to so indicate. Spring 44 differs only as to the mounting fold, indicated at 46. Mounting fold 46 includes a front leaf 48 and rear leaf 50, which are equal in area, thickness and free state separation to the spring 20 described above. However, the rear leaf 50 is stamped with an integral convex bump 52 at its approximate center, which has a height equal to about a third of the free state separation S of the front and rear leaves 48 and 50. The integral stamping of the bump 52 does not interfere with or add appreciably to the cost of manufacture of spring 44. Spring 44 can be manufactured by first stamping the bump 52 into the strip of flat spring steel that is later folded to form spring 44. The latch 38 can be lanced out at the same time. Then, the strip is advanced through a series of dies, each of which strikes the strip serially to produce the various folds one after the other, forwardmost leaf 26', the active folds 24' and 22', the mounting fold 46 and the endmost leaf 36'. In order to accommodate the bump 52, the male die about which the leaves 48 and 50 are folded can be relieved with a clearance hole large enough to freely receive the bump 52. Then, when the male die is withdrawn from between the folded leaves 48 and 50, the bump 52 can slide out of the die clearance hole, slightly spreading the leaves 48 and 50 apart. The leaves 48 and 50 are not spread so far as to exceed their elastic limit, and return to the basic free state shown in FIG. 7. But for the initially stamped bump 52 and the clearance hole to accommodate it, this is the same method and apparatus with which the spring 20 would be manufactured.

Figure 10:
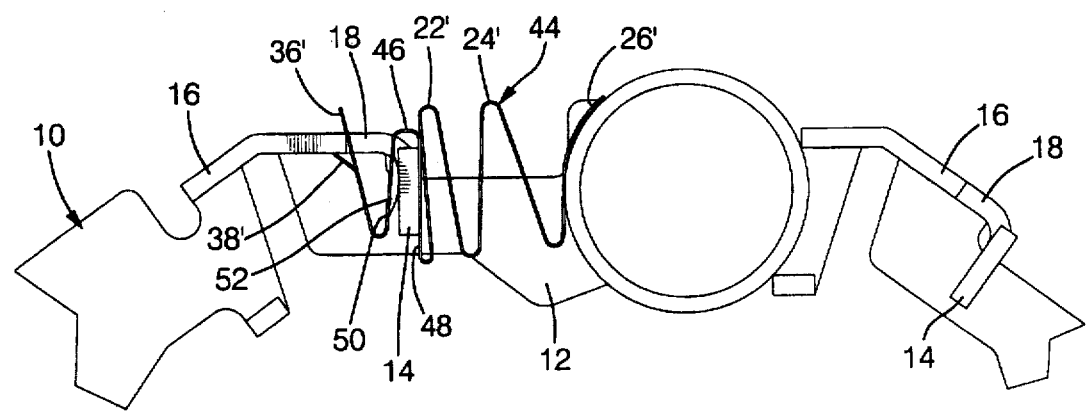
FIG. 10 shows a roller installed in front of the spring of FIG. 9, before installation between a pair of races.
Figure 11:
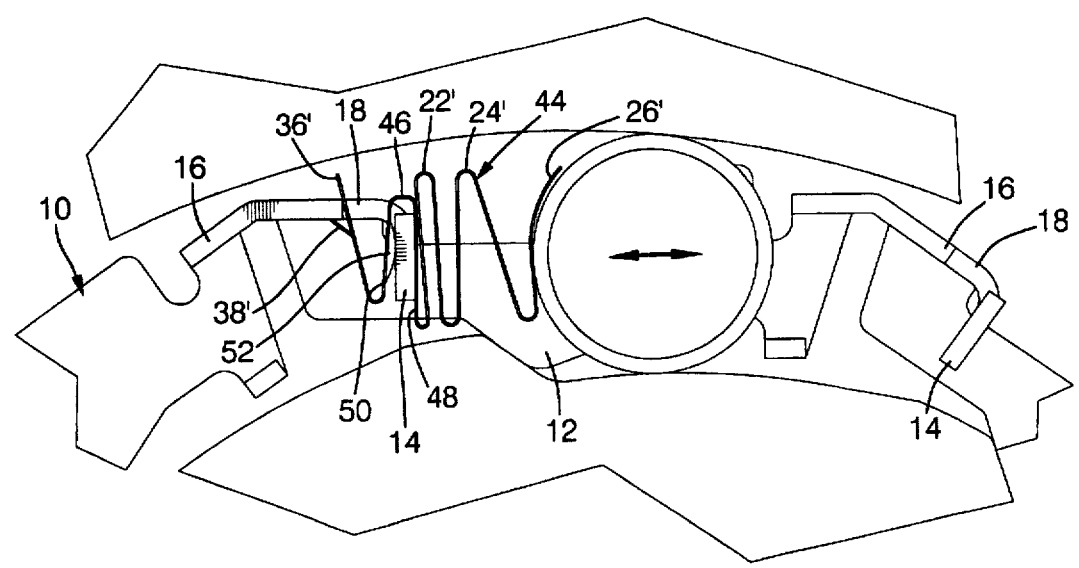
FIG. 11 shows the roller and spring of FIG. 10 installed between a pair of races and operating over a normal range of roller motion.

Referring next to FIGS. 9 through 11, the installation and operation of spring 44 are illustrated. Basically, spring 44 is installed just as spring 20 would be, being pushed radially inwardly to press the mounting fold 46 over the cage cross bar 14. In the process, the rear face of the cage cross bar 14 engages the bump 52, which acts as a spreading wedge to force the from and rear leaves 48 and 50 slightly apart from their free separation S, to the same basic degree as the height of bump 52. Because of its semi spherical shape, bump 52 effectively has a radially outwardly sloped leading edge that prevents it from catching on the outer edge of cross bar 14, and which helps to spread the mounting fold leaves 48 and 50 gradually and resiliently apart, that is, without exceeding their elastic limit. Concurrently, the endmost leaf 36' drags along the back edge of slot 18' and, eventually, the latch 38' snaps out underneath the adjacent cross bar 16 to prevent the mounting fold 46 from being pulled radially outwardly and off of the cross bar 14, as shown in FIG. 9. Now, however, the extra tension put into the mounting fold 46 by the leaf spreading bump 52 serves to keep the front leaf 48 pulled snug and flat against the front face of the cross bar 14. The force of the latch 38' does not overcome the pinching force in the mounting fold 46, and the active portion of spring 44 extends into the pocket 12 from a stable and secure base. When a roller 28 is installed, as shown in FIG. 10, the spring 44 is properly positioned to hold the roller 28 securely against the adjacent cross bar 16, or at least as securely as the resilience of spring 44 will allow. When clutch cage 10 is installed between the races 40 and 42, as shown in FIG. 11, roller 28 rolls back and forth over its normal path, and spring 44 compresses and expands. Now, however, unlike the situation described above, compression of the spring 44 does not act to push the mounting fold front leaf 48 from a first position spaced away from cross bar 14 to a second position closer to or against cross bar 14, thereby destabilizing the grip of the mounting fold 46 on cross bar 14. Instead, mounting fold front leaf 48 starts out in the snug, stable position, and extra compression of spring 44 merely adds to that stability. In other words, spring 44 acts always from a stable and secure base (the leaf 48 seated snug against cross bar 14) throughout its range of motion. Therefore, even if spring 44 is compressed somewhat beyond its normal operating path, as shown in FIG. 12, spring 44 is prevented from being pushed radially outwardly and off of roller 28.

Referring next to FIGS. 13 and 14, a second embodiment of a spring made according to the invention is indicated generally at 54. Spring 54, like 44, has most structural elements and features identical to spring 20, and these are also given the same number with a prime ('). Spring 54 has a mounting fold 56 with front and rear leaves 58 and 60 that have an equivalent free state separation S, just as with the other two springs 20 and 44. Instead of a single, round bump, however, the mounting fold rear leaf 60 has a pair of tabs 62 that are bent inwardly out of the edges, with a total height about equal to the height of bump 52. The tabs 62 are cut out as a last step, since the edges of rear leaf 60 are easily accessible to the jaws of a cutting tool even after spring 54 is fully folded. When spring 54 is assembled to cage 10, identically to spring 44, the tabs 62 drag along the rear face of cage cross bar 14, also acting as spreading wedges to put extra gripping tension into the mounting fold 56. The slope of the leading edges of the lanced out tabs is such that they drag easily along the back face of cage cross bar 14, just as with bump 52. Unlike the bump 52, however, the tabs 62 are asymmetrical, and their sharp pointed corners will dig in slightly to the cross bar 14 to help prevent withdrawal in the other direction to assist the latch 38' in retention. The widely spaced relation of the tabs 62 may also create a more stable position of the rear leaf 60, although it is the stability of the front leaf 58 that is more significant.

The invention could be incorporated in alternate designs for the spreading wedge other than the bump 52 or the tabs 62, so long as the same basic position on the mounting fold rear leaf and same basic thickness obtained. Any such structural feature would preferably have a gentle, radially outwardly sloped leading edge, as the bump 52 and tabs 62 both have, to assure an easy insertion of the mounting fold over the cage cross bar 14 and to prevent hanging up on the outer edge of the cross bar 14. The height of the bump 52, tabs 62, or equivalent structure could be greater, right up to and equal to the entire free state separation S between the mounting fold leaves. However, this would be more than needed in most cases to add enough mounting fold tension for a secure and stable grip of the cage cross bar 14.

I claim:

1. In a one way roller clutch of the type having a cage defining roller pockets, each pocket having a generally radially extending cage cross bar with a flat front face facing into said pocket and an oppositely facing flat rear face with a predetermined thickness measured between said cross bar faces, and a plurality of accordion type roller energizing springs with radially opening active folds, a spring having an improved means for mounting to said cross bar, comprising,

- a mounting fold having a flat front leaf shared with an adjacent active fold and a flat rear leaf, said front and rear mounting fold leaves having a predetermined free state separation substantially equal to said cross bar thickness, and,

- a spreading wedge on said flat rear leaf comprising a structural feature stamped integrally into said flat rear leaf and extending toward said front leaf by less than said free state separation and having a leading edge that is sloped radially outwardly, whereby said spring is mounted to said cage by pushing said spring mounting fold radially over said cross bar, thereby engaging said spreading wedge leading edge with said cross bar rear face and spreading said mounting fold front and rear leaves resiliently apart and tensioning said front leaf into the front face of said cross bar, whereby said spring is more solidly mounted to said cage and said spring active folds are more securely retained within said pocket.

* * * * *